(12) United States Patent
Baranovski

(10) Patent No.: US 7,624,729 B2
(45) Date of Patent: Dec. 1, 2009

(54) EASILY LIGHTED GRILL

(76) Inventor: Nir Baranovski, 6 Brener Street, Qiryat Ata (IL)

( * ) Notice: Subject to any disclaimer, the term of this patent is extended or adjusted under 35 U.S.C. 154(b) by 265 days.

(21) Appl. No.: 11/425,956

(22) Filed: Jun. 22, 2006

(65) Prior Publication Data

US 2006/0288995 A1    Dec. 28, 2006

(30) Foreign Application Priority Data

Jun. 26, 2005    (IL) .................................. 169385

(51) Int. Cl.
*A47J 37/00* (2006.01)

(52) U.S. Cl. .................. 126/25 R; 126/25 B; 126/25 A; 126/9 R; 126/39 R

(58) Field of Classification Search ............... 126/25 R, 126/9 R, 9 B, 39 R
See application file for complete search history.

(56) References Cited

U.S. PATENT DOCUMENTS

| | | | |
|---|---|---|---|
| 3,717,137 A | 2/1973 | Moline et al. | |
| 4,133,335 A | 1/1979 | Malafouris | |
| 4,582,041 A * | 4/1986 | Erickson | 126/9 R |
| 4,757,756 A * | 7/1988 | Van Marr | 99/482 |
| 5,676,045 A * | 10/1997 | Faraj | 99/339 |
| 5,947,013 A | 9/1999 | Stewart, Jr. | |
| 6,189,528 B1 * | 2/2001 | Oliver | 126/25 R |
| 6,209,533 B1 * | 4/2001 | Ganard | 126/25 R |
| 6,827,076 B2 * | 12/2004 | Crawford et al. | 126/25 R |

FOREIGN PATENT DOCUMENTS

| | | |
|---|---|---|
| DE | 3532589 A1 | 5/1987 |
| JP | 2001292916 A | 10/2001 |
| WO | WO 02.067740 A1 | 9/2002 |

* cited by examiner

*Primary Examiner*—Steven B McAllister
*Assistant Examiner*—Nikhil Mashruwala
(74) *Attorney, Agent, or Firm*—Shalom Wertsberger; Saltamar Innovations

(57) ABSTRACT

An easy and fast to light, device for the improved cooking of food, made for using charcoal or similar fuel, comprising a generally convex shell or an envelope, a perforated partition dividing the shell or envelope into a lighting portion and a firebox, and a lid. In optional embodiment a duct is also provided to enhance lighting.

5 Claims, 4 Drawing Sheets

EASILY LIGHTED GRILL

TECHNICAL FIELD

The present invention relates to a portable, compact device for the cooking of foods by grilling and the like, characterized by being easy and fast to light and by permitting the economical use of fuel such as charcoal.

BACKGROUND ART

Domestic-use grilling devices for the cooking of foods are well known and widely used at home, yard and camping grounds. A description of the prior art of a fast charcoal lighting device, and of two prior art cooking devices incorporating means for their fast lighting, is presented in this portion.

A known fast and easy charcoal-lighting device, is formed of a vertically positioned cylindrical tube having a bottom surface, or of a can having a closed bottom and an open top, the tube or can being divided by a partition parallel to the bottom surface into a smaller lower portion including a base and forming a lighting portion, made to accept lighting material such as lighter-fuel soaked paper, and into a larger upper firebox, made to contain the fuel to be lighted such as charcoal. The tube can be of a circular, square or of any other cross section. The partition is made of a mesh or of a disk incorporating a plurality of separated perforations, permitting a fluid-dynamic communication between said two portions but preventing most of the fuel from falling from the fuel portion into the lighting portion. Also, perforations are provided in the wall of said lighting portion to permit the drawing of air into the lighting portion, therefore facilitating the burning of the lighting material. The tube is placed on its base and the lighting material is lit. Upon lighting of the lighting material the tube serves as a flue, while the partition permits the upward flow of the hot gases and of the flames generated by the lighting material along the fuel, thus lighting the fuel. The lighted fuel is then poured into the firebox of a grill and the like.

U.S. Pat. No. 3,717,137 to Moline, John H. et al and U.S. Pat. No. 4,133,335 to Malafouris, Dennie O., present units incorporating a cooking unit including a cooking portion and a lighting portion, the cooking portion including a rectangular tray forming a firebox, the firebox is made to contain fuel such as charcoal, and the lighting portion made to contain and burn a lighting material. The firebox and the lighting portion shown in '137 and in '335 form a rectangular parallelepiped. A perforated partition separates the firebox from the lighting portion to permit fluid-dynamic communication between the lighting and the cooking portions while preventing charcoal size fuel from passing therethrough. Both patents claim cooking devices that are lighted while the firebox is projecting upward, the lighting portion disposed underneath said firebox and projecting downward, and cook while both the firebox and the lighting portion are disposed horizontally. A plurality of separated perforations in the rectangular firebox wall facing the partition, said wall being the top surface during lighting, ensure that an upward draft flows during the lighting from the lighting portion along the fuel to light it and then via the perforations to be expelled from the device. Thus, the cooking unit comprises of a lighting portion and a fuel portion, and functions much like a lighting device while vertically disposed. In both patents a base or supporting unit is provided to position the devices in either the lighting, vertical position or in the cooking, horizontal position. In both patents the food to be cooked is placed upon a grill made of relatively widely spaced thin rods. Patent '137 provides a damper, formed as a solid cover to cover the firebox of '137, in order to smother the fire at the end of the cooking and in order to create a flue like firebox and prevent spilling of the fuel from the firebox while vertically disposed. '335 provides for two lighting and cooking units which are pivotally attached to a support to be vertically disposed, attached and in registration during fuel lighting or smothering, and to be horizontally disposed in an open, extended position during cooking.

Most of Both '137 and '335 describe relatively complicated structures, made of a fairly large number of often complicated parts, requiring special tools for their manufacturing, although '137 teaches also, among others, a simpler device. Therefore, while both of the aforementioned cookers seem to cook adequately by current standards, simpler devices for better cooking and more economical to build are called for.

SUMMARY OF THE INVENTION

The present invention is directed to an easy and fast to light, portable device for the improved cooking of food, made for using charcoal or similar fuel.

Herein the term "shell" refers to a relatively thin sheet of fire resistant metal and the like such as galvanized steel, of any generally closed and generally convex configuration, defining a shell volume, having two facing and generally parallel surfaces termed shell extremities, said shell having an shell axis intersecting said extremities, one extremity is termed "shell base" herein and the other is termed "shell top", said shell having a preferably planar shell opening having a circumference and adjoining said shell top, said shell opening extending towards said shell base and generally parallel to said shell axis.

"Envelope" refers to any shell with the exception of a rectangular parallelepiped shell.

The term "fuel" as used herein refers to charcoal or to other kinds of fuel comprising solid lumps.

An aspect of the present invention includes an envelope defining an envelope volume, having a first and a second envelope extremities positioned on said axis and serving as an envelope base and an envelope top, respectively, said envelope volume and envelope being divided by a partition into a preferably smaller lighting envelope including said base, said partition being in contact with said opening circumference and away from said top, said partition preferably disposed perpendicular to said axis, said partition and lighting envelope forming lighting portion made to contain lighting material and including said base, and a preferably larger cooking envelope including said top, said partition, at least part of said opening and the remaining parts of said envelope, forming a cooking portion or a firebox. Said at least part of said opening is termed "cooking opening". Said cooking and lighting portions are horizontally disposed during cooking and point, respectively, upward and downward during lighting. Said firebox being made to contain fuel for the cooking of food, said partition includes a plurality of separated perforations, said perforations are made to permit fluid-dynamic communication therethrough while substantially preventing the fuel from being admitted into said lighting portion, said lighting envelope having an aperture therein to permit the introduction of lighting material into said lighting portion, said top including a plurality of separate perforations thereabout, said perforations being made to permit the discharge of burnt gas out of said cooking portion during lighting while substantially preventing the fuel from passing therethrough. This configuration of this invention is termed "envelope grill" herein.

Said cooking opening being selectably coverable by a lid, said lid being preferably adapted for the cooking of food placed thereon while covering said cooking opening. Alternatively, said envelope lid may be replaced by a griddle after the lighting.

As is well known, the griddle used for cooking of food is usually made of relatively thin, round, spaced rods or wires wherein the gaps between the wires are much larger than the wire diameter.

It is also known that cooking on a thick metal plate usually leads to better and tastier food. It has been found by the inventor of this invention that cooking on a perforated, preferably thick plate serving as a griddle rather than on the commonly used griddle made of widely separated thin rods, enhances the lighting of this inventive device its lighting position, while giving the food the typical flavor of grilled food. This enhancement is probably due to suction of ambient air into the firebox by the rising hot gases.

Therefore, a perforated plate or lid as used in this invention performs the dual functions of serving as a griddle for the cooking of foods on it and as a firebox lid, permitting the closing of the firebox and the enhancing the lighting of this inventive grill in its lighting position. The perforations of the lid may be unevenly distributed.

Optionally all or part of said partition or of said lid may be formed of a mesh or a grid made to permit the easy passage of gas therethrough while substantially preventing the fuel from passing through it.

It should be understood that, as used herein, any partition or any second extremity, top or lid is formed as the abovementioned partition and the second extremity or top are, i.e. including a plurality of separate perforations in a fire resistant material, or made of a fire-resistant mesh or a grid of suitable spacing and the like. It should also be understood that the word "perforation", as used herein, means a bore of any shape in a sheet metal and the like or an opening formed by wire mesh or the gap between two rods of a griddle and the like, its purpose being to permit gas flow while substantially preventing fuel passage, at least many of the perforations being substantially separated.

Another configuration of present invention includes a shell as defined above. It is to be understood that when an element is not described as an "envelope element", it is a shell element. Said volume and shell being divided by a partition into a preferably smaller lighting shell including said base, said partition being in contact with said opening circumference and away from said top, said partition preferably disposed parallel to said top and base, said partition and lighting shell forming lighting portion made to contain lighting material and including said base, and a preferably larger cooking shell including said top, said partition, at least part of said opening and the remaining parts of said shell, forming a cooking portion, the inner parts of said cooking portion form a firebox. Said at least part of said opening is termed "cooking opening". Said cooking and lighting portions are horizontally disposed during cooking and point, respectively, upward and downward during lighting. Said firebox being made to contain fuel for the cooking of food, said partition includes a plurality of perforations, said lighting shell having an aperture therein to permit the introduction of lighting material into said lighting portion, said top including a plurality of separate perforations thereabout. Said cooking opening being selectably coverable by a lid, said lid being preferably adapted for the cooking of food placed thereon while closing said opening. This configuration of this invention is termed "shell grill" herein.

In still another configuration of the present invention said firebox further incorporates a perforated duct for the flow of gases emanating from the lighting portion, made to facilitate the lighting of the fuel, said duct comprising an elongate body including a first duct extremity attachable to said partition to permit fluid-dynamic communication between said lighting portion and the duct, said duct extending away from said partition and at least partly towards said second shell extremity, said duct being generally parallel to said axis. The duct may be of a round, square or other closed section or it may be formed by attaching the open side of a channel-like section to a wall of the firebox to form a duct. This configuration of this invention is termed "ducted shell grill" herein.

It should be understood that "duct", as used herein means a perforated tube of any cross section having two tube extremities, one extremity being attached to said partition within the cooking portion of this inventive device and the other extremity attached to, or pointing towards, the top part of the cooking portion. Alternatively, a duct may be formed by attaching the open side of a perforated section such as "L" section or a bent perforated sheet to a side of a firebox, thus enclosing a volume of the firebox.

In still another configuration of this inventive device, two pivotally attachable shell grills as shown hereinabove are provided, each one of said shells being provided with a planar opening in its cooking portions, said shells are further made to bring said openings to registration while pivoted to a configuration termed "closed" herein, and to place said openings in a substantially adjoining co-planar relationship while pivoted to a configuration termed "open" herein, the closed configuration preferably used for lighting or carrying, the open configuration used for cooking. This configuration of this invention is termed "double shell grill" herein.

Yet another configuration similar to the double shell grill but comprising at least one ducted shell grill is termed "double ducted shell grill" herein.

LIST OF FIGURES

DESCRIPTION OF THE ILLUSTRATIVE EMBODIMENTS

The lighting of fuel in cooking devices is often tedious and usually calls for the use of initiating materials, such as lighter-fuel soaked paper or other materials that burn intensively for a sufficiently long period of time to light the fuel.

Several embodiments of this inventive device of easily lighted portable food cooking devices are shown and described herein, and their operation is explained.

Figure 1:
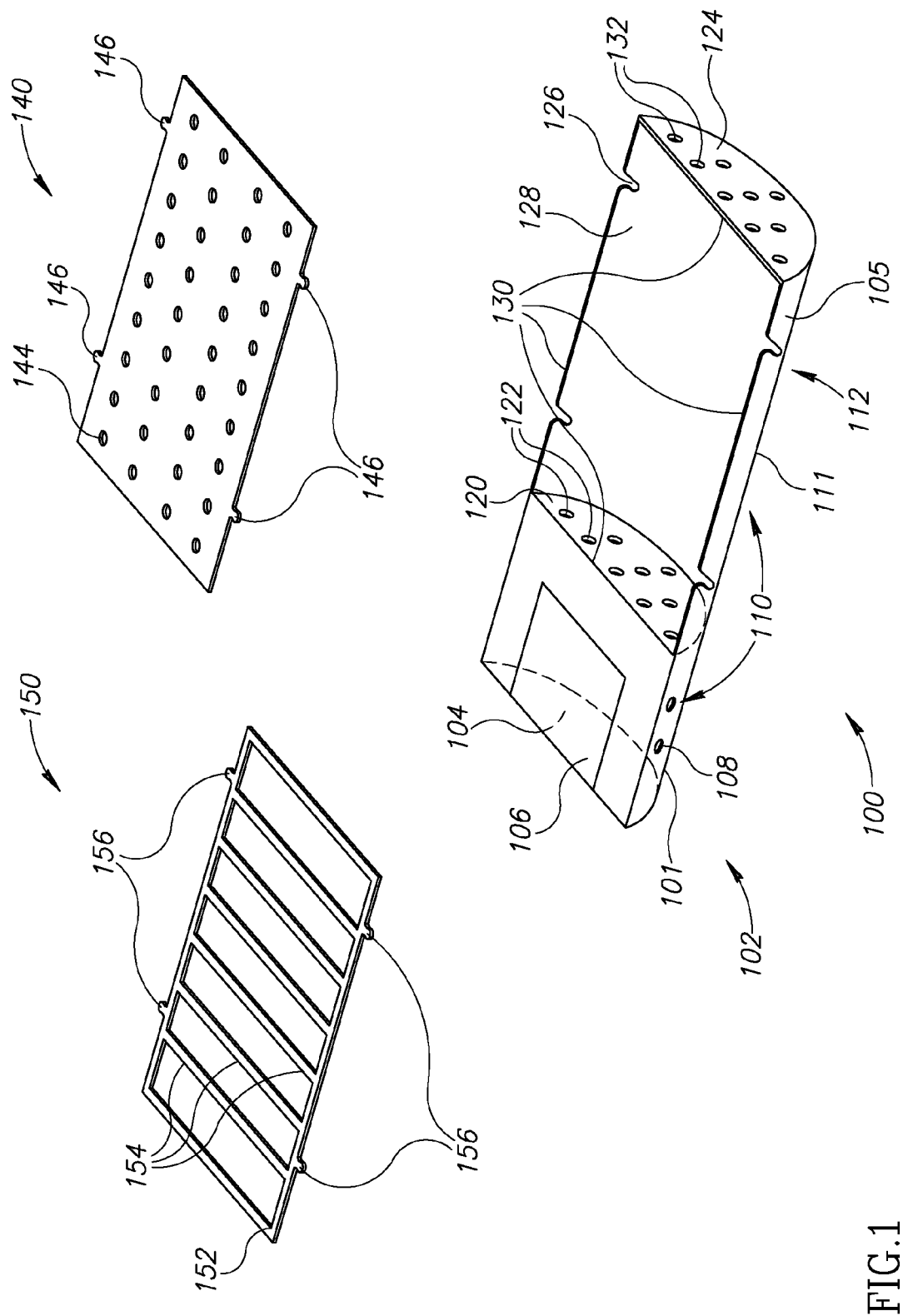
FIG. 1 is a depiction of an envelope-based device according to a preferred embodiment of the invention.

One illustrative embodiment according to this invention of a cooking device 100, is depicted in FIG. 1, wherein semi-cylindrical envelope 110 is shown, said envelope including semi-circular extremities 104, 124 and semi-cylindrical face 105, envelope 110 being divided by partition 120 into a smaller lighting envelope 101 defining, with partition 120, lighting portion 102, and into a larger cooking envelope 111 defining, with partition 120, cooking portion 112. A number of air intakes 108 may be provided in 101. Other configurations of envelopes may be used in other embodiments of this inventive device. A plurality of perforations 122 in partition 120 permit fluid-dynamic communication between portion 102 and portion 112. Aperture 106 in envelope 101 permits the introduction of lighting material such as lighter-fuel soaked paper into lighting portion 102.

A preferably planar and rectangular part of cooking envelope 111, generally parallel to said axis, is open to form cooking opening 130 of firebox 128, said firebox including said partition and second base 124. Four slots 126 formed in 112 are provided to accept four protrusions 146 of lid 140, lid 140 is made to fit within cooking opening 130 and to substantially cover 130, said slots could be perpendicular or inclined to 130.

When device 100 is used, lighting material, not shown, is introduced into lighting portion 102, fuel is introduced into firebox 128 and lid 140 is placed to cover 130. Device 100 is then placed with base 104 of envelope 110 pointing downward and with top 124 of envelope 110 pointing upward. The lighting material is then ignited and an upward flowing draft emanating from said lighting material flows via perforations 122 and along the fuel in cooking portion 112, lighting said fuel, said draft is then expelled via a plurality of perforations 132 formed on 124. Lid 140 may be solid or it may include perforations 144. A sufficient number of perforations 144 is provided to allow adequate draft therethrough during cooking, but not too numerous so that the upward draft is largely confined within cooking portion 112 during the fuel lighting. Once the fuel is burning, device 100 is positioned horizontally and food is placed on perforated lid 140 for cooking. Alternatively, lid 140 may be attached by hinges (not shown) to one side of cooking opening 130 to permit its covering or uncovering.

In another alternative, lid 140 may be replaced by griddle 150, said griddle comprising of frame 152, bars 154 and protrusions 156, frame 152 is made to fit opening 130 and protrusions 156 are made to fit in slots 126.

Figure 2:
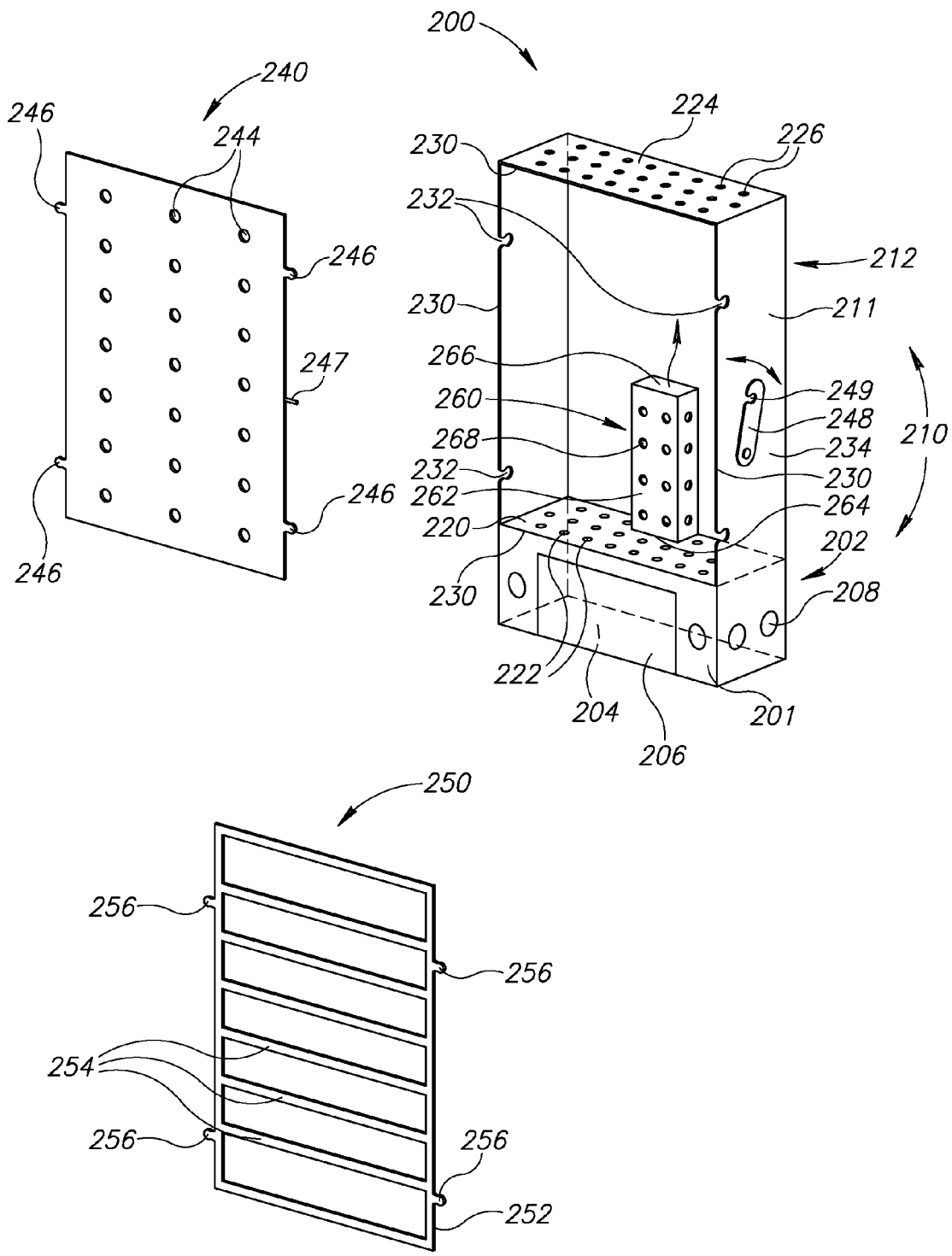
FIG. 2 is a depiction of a shell-based device according to another preferred embodiment of the invention.

Another illustrative embodiment according to this invention of a cooking device 200, is depicted in FIG. 2, wherein rectangular parallelepiped shell 210 including base 204 and top 224 is shown, said shell being divided by partition 220 into a smaller lighting shell 201 defining with partition 220 lighting portion 202, and into a larger cooking shell 211 defining with partition 220 cooking portion 212, one large face of shell 211 being open to form planar and rectangular cooking opening 230. Other configurations, not shown, of shells, including one large opening such as a cylinder with one open circular base serving as a cooking opening with matching lid and griddle, may be used in similar embodiments of this invention. Aperture 206 in shell 201 permits the introduction of lighting material such as lighter-fuel soaked paper into lighting portion 202. Shell 211, 220 and opening 230 define firebox 228.

Lid 240, selectably attachable to 210 by protrusions 246 and recesses 232, is made to substantially cover 230 during lighting or cooking and to uncover portion 212 when needed. Slotted bracket 248, rotatably attached to wall 234 of portion 212, secures lid 240 in its covering position by fitting groove 249 to protrusion 247. Alternatively, lid 240 may be pivotally attachable such as by hinges (not shown) to one side of 230 to permit the covering and the uncovering of 230.

Duct 260, disposed within firebox 228 may by provided, is made of a tubular body 262, said body 262 being provided with a plurality of duct perforations 268, duct 260 further including two duct extremities 264, 266, extremity 264 being attachable to partition 220 and surrounding at least one perforation 222, duct 260 extends at least part way towards extremity 224.

When this inventive device is used, lighting material, not shown, is introduced into lighting portion 202, fuel is introduced into firebox 228 and lid 240 is placed to cover opening 230 Device 200 is then placed with base 206 of shell 210 pointing downward and with top 224 of shell 210 pointing upward. The lighting material is then ignited and an upward flowing draft, emanating from said lighting material, flows via perforations 222 along the fuel in firebox 228 lighting said fuel, said draft is then expelled via a plurality of separated perforations 226 formed on 224. Part of the draft flows within said duct and emanates from said duct perforations 268 and second extremity 266 to facilitate the flow of the draft and to better light fuel along duct 260. Once the fuel is burning, device 200 is positioned horizontally and food may be placed on lid 240. A sufficient number of perforations 244 is made in lid 240 to allow adequate draft therethrough during cooking, but not too numerous so as to substantially contain the upward draft within cooking portion 212 during the fuel lighting. Alternatively, lid 240 may removed and griddle 250 be placed on 230, said griddle comprising of frame 252, bars 254 and a protrusions 256, frame 252 is made to fit opening 230.

Figure 3:
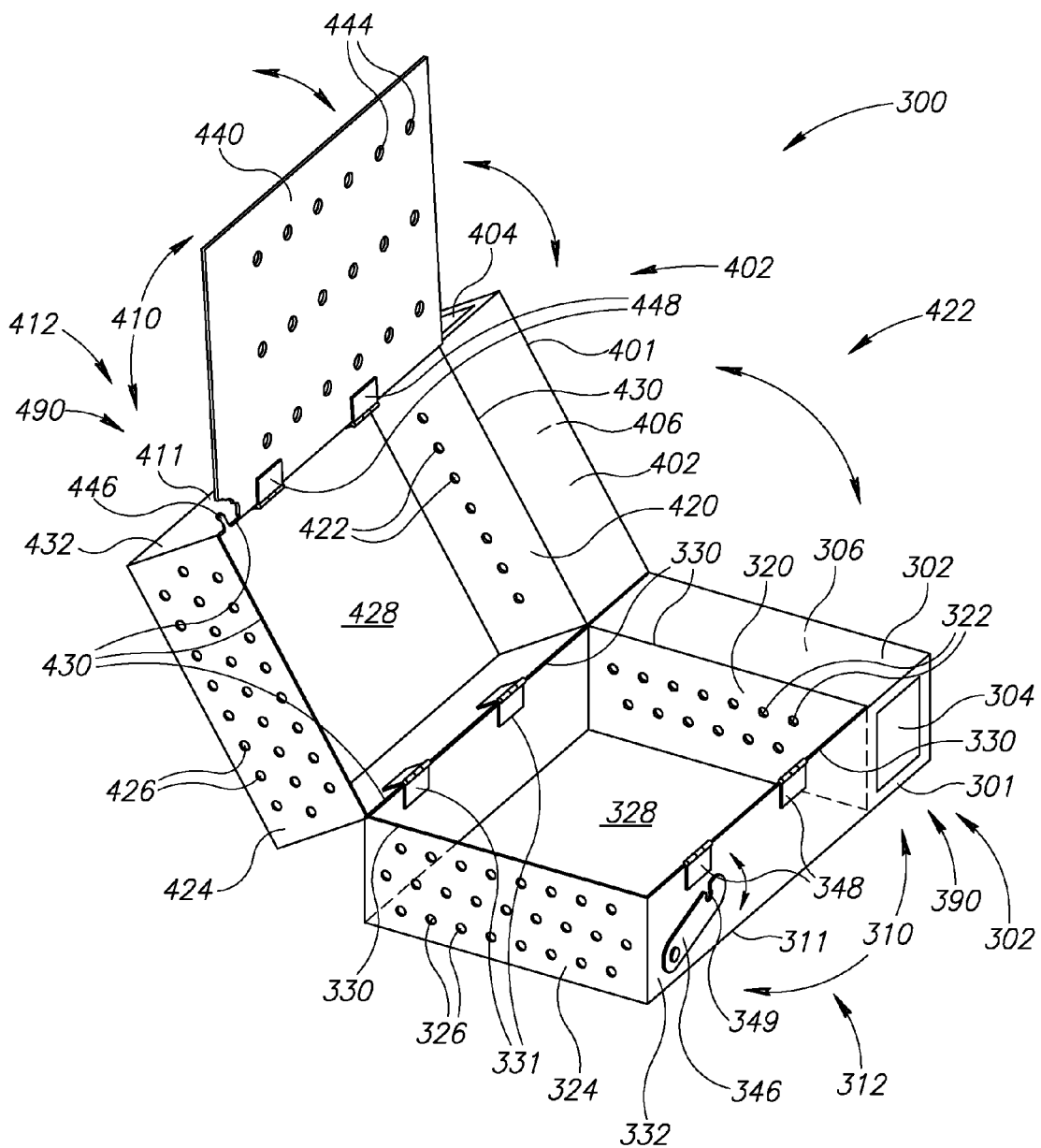
FIG. 3 is a depiction of a double-shell based device according to the preferred embodiment of the invention.

Yet another illustrative embodiment according to this invention of a cooking device 300 is depicted in FIG. 3, wherein two symmetrically similar shells 390, 490 of this inventive design are pivotally attachable to be brought in registration in the closed, lighting configuration of this device, and be brought to a co-planar, adjoining position in cooking configuration.

The designation of elements of 490 is the same designation of similar elements of 390, increased by 100. Therefore when two successive numbers differing by 100 are shown, they refer to similar elements in 390 and 490, respectively. In order to provide a clearer view, some elements mentioned in this description are not shown in FIG. 3.

Rectangular parallelepiped shell 310 including base 306, and top 324, and similar shell 410 including base 406 and top 424, are divided by partitions 320, 420 into smaller lighting shells 301, 401 defining, with partitions 320, 420, lighting portions 302, 402 and into larger cooking shells 311, 411 defining, with partitions 320, 420, cooking portions 312, 412. Partition 320 is preferably parallel to base 306 and top 324 and partition 420 is preferably parallel to base 406 and top 424. Other configurations of shells may be used in similar embodiments of this inventive device. Apertures 304, 404 in shells 301, 401 permit the introduction of lighting material such as lighter-fuel soaked paper into lighting portions 302, 402. Shells 311, 411 include cooking openings 330, 430. The inner part of shells 311, 411, the contiguous side of 320, 420 and cooking openings 330, 430 define fireboxes 328, 428.

Lid 340, not shown, and lid 440, respectively, are pivotally attachable to walls 332, 432 of shells 310, 410 by hinges 348, 448 and are made to substantially cover 330, 430 during cooking or lighting and to uncover portions 312, 412 when needed.

When this inventive device is used, lighting material, not shown, is introduced into lighting portions 302, 402, fuel is introduced into fireboxes 328, 428 and lids 340, 440 are brought to cover opening 330, 430. Shells 390, 490, pivotally connected by hinges 331, are then pivoted to the closed position, positioning 330, 430 in registration. Slotted bracket 346, rotatably attached to wall 332 of portion 312, secures 390, 490 in their closed position by fitting groove 349 of 346 to protrusion 446.

Device 300 is then placed with bases 306, 406 pointing downward and with tops 324, 424 pointing upward. The lighting material is then ignited and an upward flowing draft emanating from said lighting material flows via perforations 322, 422 along the fuel in fireboxes 328, 428 of cooking portions 312, 412, lighting said fuel, said draft is then expelled via a plurality of perforations 326, 426. Any of lids 340, 440 may be solid or may include perforations 344, not shown, and perforations 444. Once the fuel is burning, bracket 346 is detached from protrusion 446, device 300 is positioned horizontally with 390, 490 pivoted to a coplanar, adjoining, open configuration, and food may be placed on perforated lids 340, 440. A sufficient number of perforations 344, 444 is made to allow adequate draft therethrough during cooking.

Alternatively, any of lids 340, 440 may be pivoted to expose 330, 430, or be removed and griddles, not shown, be placed on any of 330, 430, said griddles comprising of frame and bars as is known, said griddles are made to fit openings 330, 430.

It is stated that during lighting it was found that perforations such as 144, 244, 344, 444 draw air into the fireboxes rather than let the hot draft be expelled through them, thus facilitating the lighting of the fuel. The selected size and density of the perforations affects the cooking and the intake of air, therefore several differently perforated lids may be provided. A range of solid lid area to total lid area of about 0.2 to 0.95 of a commercially available plate improved the lighting and sustains burning.

Figure 4:
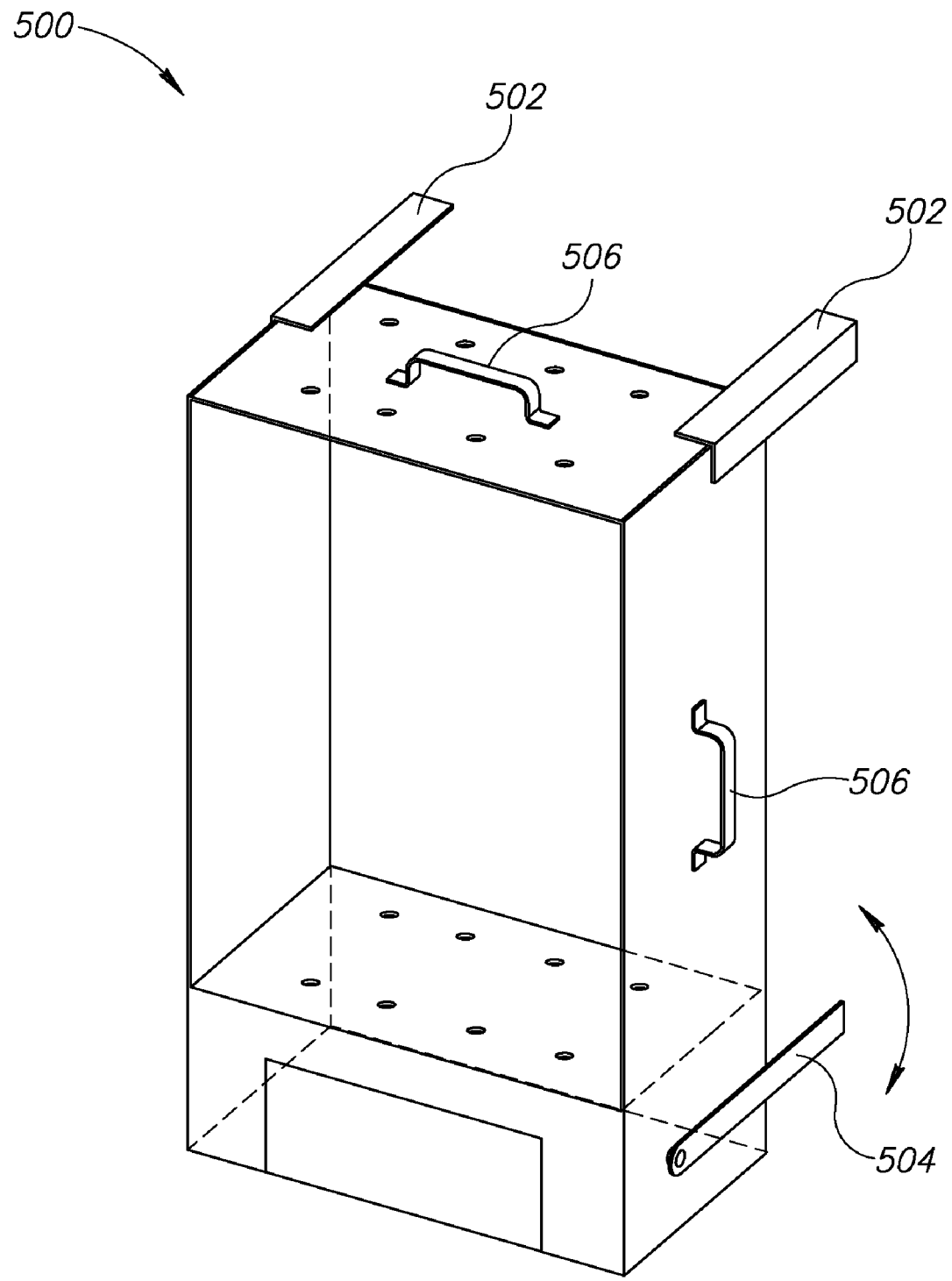
FIG. 4 is a depiction of several additional features according to any embodiment of the invention.

Several additional features of this inventive design of a cooking device 500 are depicted in FIG. 4, wherein said additional features are shown attached to a skeletal representation an inventive design similar to that shown in FIG. 2. Any or all of these features may be incorporated in any embodiment of this inventive device. FIG. 4 illustrates only the functioning of those additional features in conjunction with the functioning of the illustrative embodiment of this inventive design as shown in FIG. 2, but it is readily apparent to persons skilled in the art that these features may be the incorporated in any embodiment of this inventive design.

Any number of fixed supporting legs 502 may be provided in appropriate parts of this inventive design, such as along the corners of said shell. Alternatively or additionally, folding legs 504 may be provided. Also, handles 406 for carrying and handling this inventive device may be provided in any number of places of 500.

It will be appreciated that the invention is not limited to what has been described herein merely by way of an example. While there have been described what are at present considered to be the preferred embodiments of this invention, it will be obvious to those skilled in the art that various other embodiments, changes and modifications may be made therein without departing from the spirit or scope of this invention and that it is therefore aimed to cover all such changes and modifications as fall within the true spirit and scope of this invention, for which letters patent is applied.

The invention claimed is:

1. A charcoal-type fuel device for the easy lighting and the cooking of foods,
    comprising:
        two pivotably attachable components, wherein each one of said components comprises:
        a shell defining an interior volume within said shell
        a perforated partition
        a lid,
            said shell defines a shell surface, said shell surface includes a base and a top, said top disposed opposite to said base, at least said top being perforated, said shell further having an opening, said opening is proximate to said top and extending towards said base,
        said partition is disposed within said shell to divide said shell into a lighting portion extending towards said base and a into firebox, said firebox extending towards said top and comprising at least part of said opening, said partition constructed to permit the flow of gases but prevent the passage of fuel therethrough,
        said lighting portion comprises an aperture for the introduction of lighting material therethrough,
        said lid is made to selectably cover said opening during lighting or cooking,
        said perforations are made to permit the flow of gases but to prevent the passage of fuel therethrough;
    said two components are constructed to:
    pivotally being placed in registration in a closed configuration; and,
    to adjoin in an open configuration;
    wherein at least one of said components further comprises a duct,
        said duct comprising a tube, two duct extremities and a plurality of perforations, one of said duct extremities being coupled to said lighting section, and said other duct extremity extending towards, or in contact with, said top.

2. A device according to claim 1 constructed to accept a griddle in said opening.

3. A device according to claim 1 further comprising means for the securing of said lids to said device.

4. A device according to claim 1 further comprising means for securing of said components in the closed position.

5. A device for cooking food according claim 1 further comprising at least one supporting leg.

* * * * *